(12) United States Patent
Hystad

(10) Patent No.: US 7,004,470 B2
(45) Date of Patent: Feb. 28, 2006

(54) DEVICE FOR A PIPE FLANGE SEAL

(76) Inventor: Ann Helen Hystad, Stølen 29, Kopervik (NO) N-4250

( * ) Notice: Subject to any disclaimer, the term of this patent is extended or adjusted under 35 U.S.C. 154(b) by 0 days.

(21) Appl. No.: 10/471,341

(22) PCT Filed: Mar. 1, 2002

(86) PCT No.: PCT/NO02/00085

§ 371 (c)(1),
(2), (4) Date: Mar. 15, 2004

(87) PCT Pub. No.: WO02/071022

PCT Pub. Date: Sep. 12, 2002

(65) Prior Publication Data

US 2004/0145123 A1    Jul. 29, 2004

(30) Foreign Application Priority Data

Mar. 8, 2001    (NO) .................................. 20011175

(51) Int. Cl.
*G01M 3/14*    (2006.01)
(52) U.S. Cl. ...................... 277/317; 277/320; 277/614; 285/93
(58) Field of Classification Search ................ 277/317, 277/318, 320, 614; 285/93
See application file for complete search history.

(56) References Cited

U.S. PATENT DOCUMENTS

| | | | | |
|---|---|---|---|---|
| 3,141,685 A | | 7/1964 | Watts | |
| 3,628,812 A | * | 12/1971 | Larralde et al. | 285/24 |
| 3,747,963 A | * | 7/1973 | Shivak | 285/336 |
| 4,168,853 A | * | 9/1979 | Ahlstone | 285/336 |
| 4,272,109 A | | 6/1981 | Ahlstone | |
| 4,410,186 A | | 10/1983 | Pierce, Jr. | |
| 4,950,000 A | * | 8/1990 | Richardson | 285/15 |
| 5,231,867 A | * | 8/1993 | Serwatzky | 73/46 |
| 6,299,216 B1 | * | 10/2001 | Thompson | 285/93 |
| 6,318,766 B1 | * | 11/2001 | Babuder et al. | 285/328 |

FOREIGN PATENT DOCUMENTS

| | | |
|---|---|---|
| GB | 1558857 | 1/1980 |
| NO | 175832 | 9/1994 |

\* cited by examiner

*Primary Examiner*—Alison K. Pickard
(74) *Attorney, Agent, or Firm*—Andrus, Sceales, Starke & Sawall, LLP

(57) ABSTRACT

An arrangement for access to the external cylindrical/barrel shaped surface (16*b*) of a gasket (16) in flange connections in a piping installation in which the piping installation comprises flange halves (1, 1') of the type in which a gasket (16) is positioned between the flange halves (1, 1') and the gasket (16) is designed to seal against seating surfaces (2*a*, 2*c*) formed by annular grooves (2, 2') in the opposite end faces of the flange halves (1, 1'), and where annuli (22, 22') are defined by the end faces (16*c*) of the gasket (16) and the grooves (2, 2'), which thereby seal along the inner and outer periphery, and where at least one groove (14) runs from the annular groove (2, 2'), essentially in the radial, outward direction.

19 Claims, 6 Drawing Sheets

I-I

DEVICE FOR A PIPE FLANGE SEAL

CROSS REFERENCE TO RELATED APPLICATION

The present application is the U.S. national stage application of International Application PCT/N002/00085, filed Mar. 1, 2002, which international application was published on Sep. 12, 2002 as International Publication WO 02/07 1022. The International Application claims priority of Norwegian Patent Application 20011175, filed Mar. 8, 2001.

FIELD OF THE INVENTION

This invention regards an arrangement for leakage testing and monitoring of flange connections in piping installations in which the piping installation comprises flange connections of, the type in which a gasket is placed between the flange halves, and where the gasket is designed to seal against seating faces formed by annular grooves in the opposite end faces of the flange halves, and where annuli are defined by the end faces of the gaskets and the grooves that are thus sealed along both the inner and outer periphery.

Due to its many advantageous features, the type of flange connection in question is used extensively in process plants, and is well known in connection with e.g. petroleum production. The flanges and the associated gaskets exist in standard designs, e.g. in accordance with American Petroleum Institute (API) and American National Standards Institute (ANSI), for application with a wide range of pressures and dimensions.

BACKGROUND OF THE INVENTION

During the operation of the process plant, it is crucial to the functioning of the plant that all flange connections be tight. It is obvious that even small leaks from pipelines carrying flammable gases at high pressures are undesirable and highly dangerous. Thus the internal inspection routines for a process plant comprise both a periodic inspection of flanges and a pressure testing plan for the pipes.

In conventional pressure testing of piping installations, the pipes are first drained of their contents, whereupon the piping installation is filled with a non-flammable gas such as nitrogen and pumped up to a pressure in considerable excess of the normal operating pressure of the installation. If the pressure in the installation does not fall subsequent to the filling, the installation is pressure tight. In the opposite case, there is at least one leak that must be located and repaired before the installation is pressure tested again. Locating leaks may be highly time consuming, even though some equipment is available for this purpose. The consumption of non-flammable gas when using this conventional pressure testing method is relatively high. The amount of time spent on gas filling and building up pressure is also considerable.

In order to overcome the unfavourable aspects of conventional pressure testing, several methods have been proposed in which flange connections may be tested individually, and where in some methods it is also possible to monitor the individual flange connections for leaks.

Norwegian patent 175 832 describes a method of testing and monitoring which has gained extensive use. According to the patent, a gasket is provided with bores that connect the initially mentioned annuli positioned between the end faces of the gasket in the grooves in the f flange halves, with an external piping connection. By filling pressurised gas in the annuli and then monitoring the pressure value, it may be determined whether the flange connection is tight or not. Likewise, the flange connection may be connected to a monitoring apparatus that is known per se, e.g. a pressure switch, which is designed to transmit a signal upon a pressure increase in the annuli during operation. Thus is achieved a leakage warning that may be attributed to an individual flange connection.

Said piping connection connected to the external cylindrical surface of the gasket runs through the annular gap formed between the flange halves when two flange halves of the type in question are joined. The gap, which according to the standardised flange design is approximately constant across a wide range of dimensions, is well suited for providing access to the external periphery of the seal.

Some types of flange connections however are not provided with gaps sufficiently dimensioned to allow the connection of a pipe to the gasket. According to prior art, it is not possible to use piping connections according to Norwegian patent 175 832 on flange connections of this type.

SUMMARY OF THE INVENTION

The object of the invention is to overcome this unfavourable aspect of the latter type of flange connection.

The object is achieved in accordance with the invention by he characteristics stated in the description below and in the appended claims.

The annular groove in the end face of a flange half has a trapezoidal cross section. The shortest parallel side of the trapezium forms the bottom of the groove. The seating surfaces that fit against the gasket in a complementary manner are formed by the two non-parallel sides, and mainly by the innermost portion of these non-parallel sides.

Gaskets of the type in question are normally provided with an octagonal cross section. Two of the opposite sides of the octagon form the end faces of the gasket, two opposite sides form the internal and external cylinder surfaces, respectively, while the four intermediate sides form the sealing surfaces of the gasket, which are designed to seal against the seating surfaces of the flange halves.

When a gasket is squeezed into the trapezoidal annular groove of the two flange halves, there is no contact, and therefore no sealing function between the external cylindrical surface of the gasket and the flange material. The external cylindrical surface of the gasket is therefore well suited for connection of a pipe, also when the flange halves are almost squeezed together during assembly. According to the invention, flanges of the type in question are provided with at least one groove that runs in the radial direction from the annular groove and out to the outside part of the gasket. The depth of the groove essentially corresponds to half of the axial length of the external cylindrical portion of the gasket.

Said groove does not affect the sealing surfaces of the seal and, when screwing the flanges together, forms an access opening for a pipe to be connected to the external cylinder surface of the gasket.

BRIEF DESCRIPTION OF THE DRAWINGS

The following describes two non-limiting examples of two preferred embodiments illustrated in the accompanying drawings, in which.

DETAILED DESCRIPTION OF THE INVENTION

Figure 1:
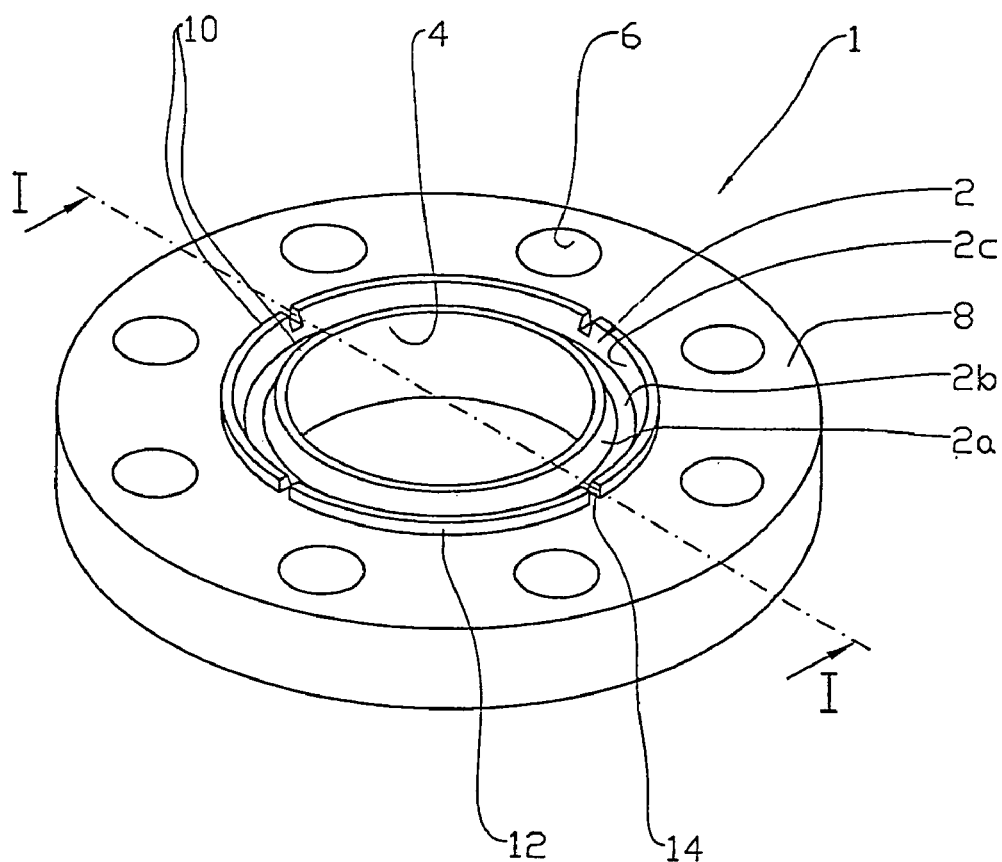
FIG. 1 shows a perspective view of a piping flange half in which is provided a groove in a groove edge that projects from the flange half.
Figure 2:
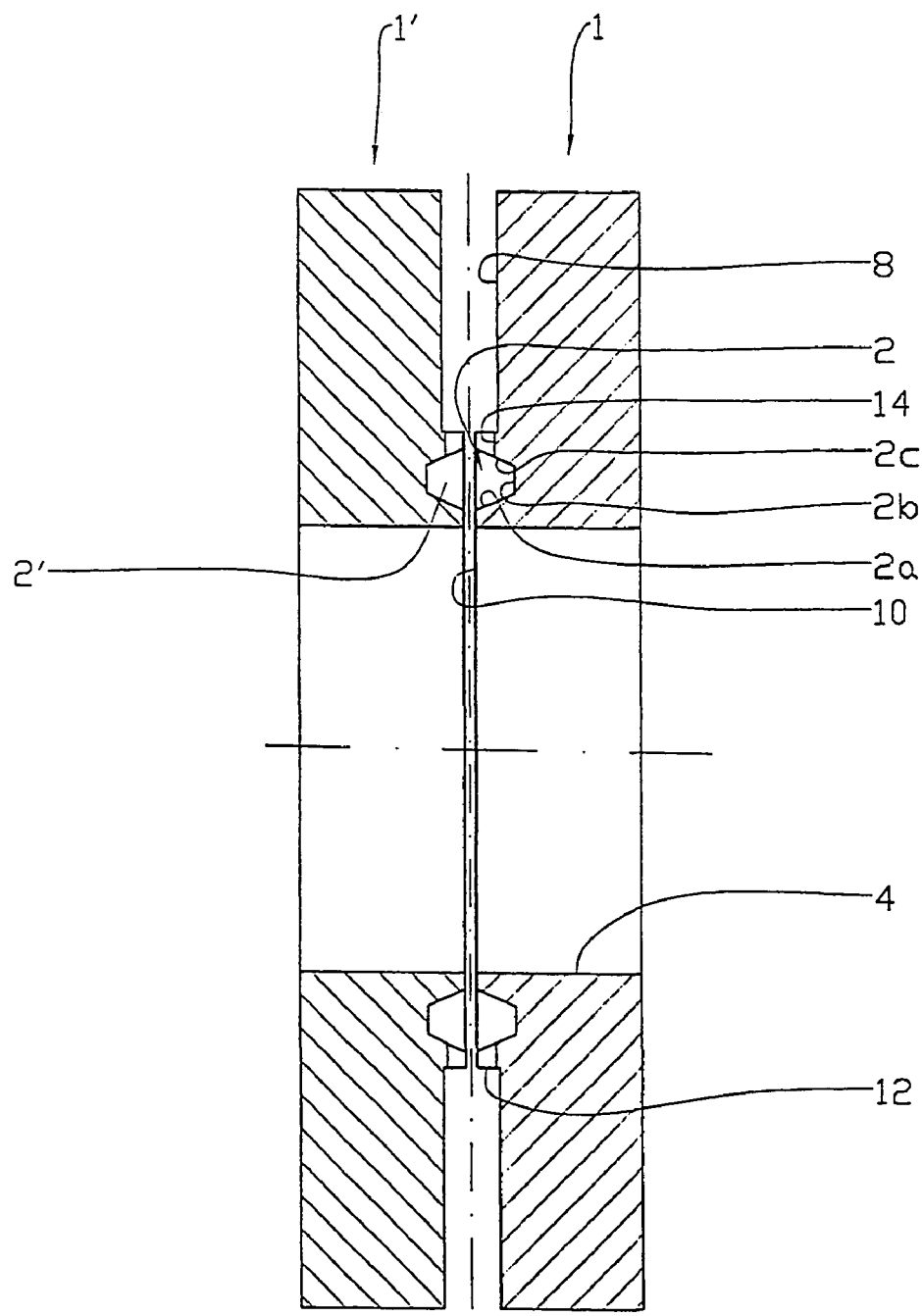
FIG. 2 is a section I—I through the flange in FIG. 1, but where two flange halves have been put together.
Figure 3:
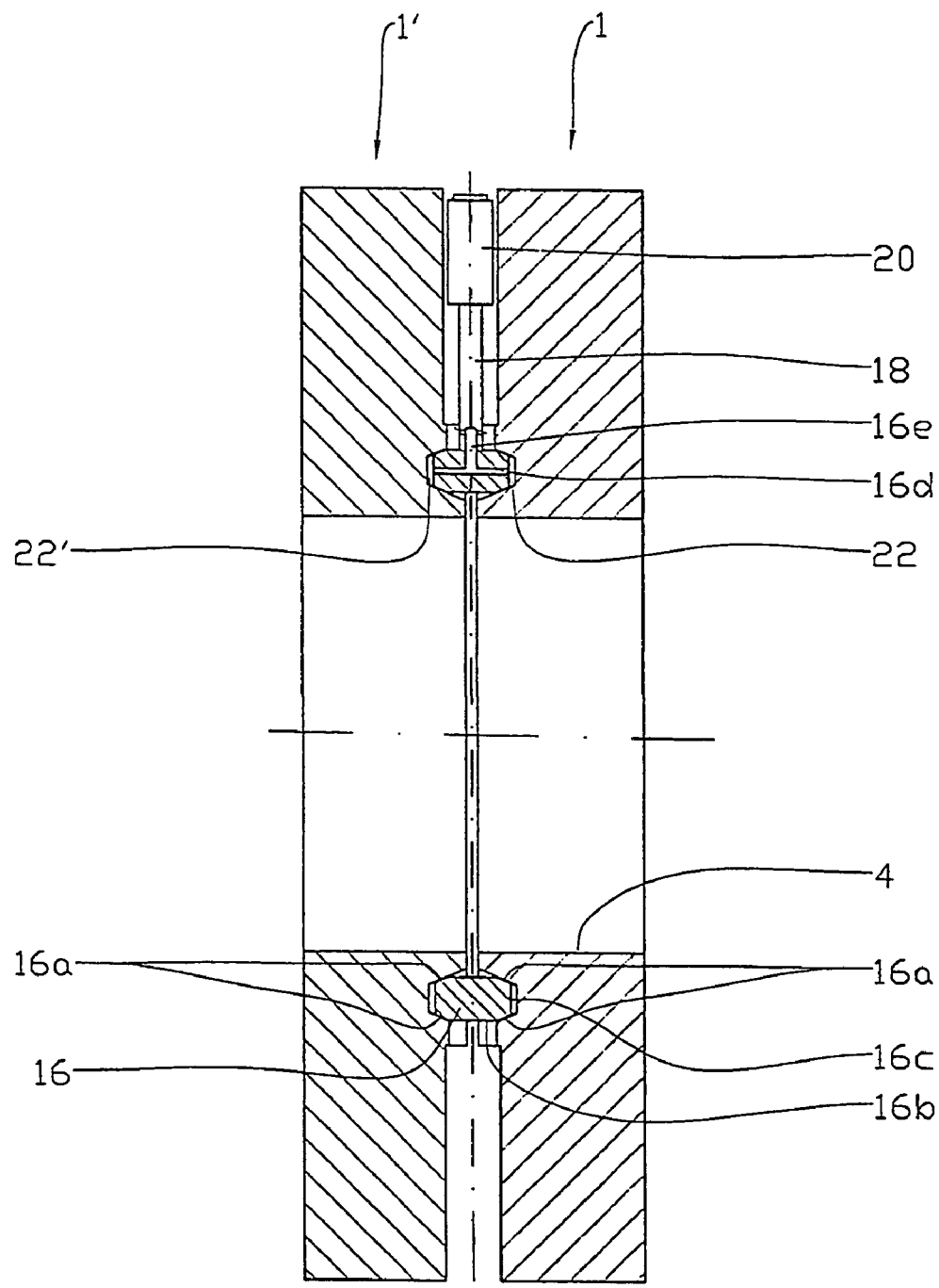
FIG. 3 shows the same section as FIG. 2, but here a gasket has been positioned in the annuli of the flanges, where the gasket communicates with a connected-up pressure indicator via a connecting pipe.

In the drawings, reference number 1 denotes a pipe flange half comprising a trapezoidal annular groove 2, a through central opening 4 and several through bolt holes 6. The trapezoidal annular groove 2 is composed of an inner tapered seating surface 2a, a bottom 2b and an outer tapered seating surface 2c.

The outer end face 8 of the flange half 1 is slightly depressed relative to the inner end face 10 of the flange half. A shoulder 12 connects the two faces 8 and 10. At least one groove 14 is provided in the radial direction from the annular groove 2 out to the shoulder 12. The depth of the grooves 14 essentially corresponds to half the length of the external cylindrical surface 16b of a gasket 16, while the width of the grooves 14 is matched to the diameter of a pipe 18.

When a gasket 16 is positioned in the annular grooves 2, 2' of two flange halves 1, 1', the sealing surfaces 16a of the gasket 16 abut the seating surfaces 2a and 2c of the flange halves. The pipe 18, which connects e.g. a pressure switch 20 that is known per se, to the external cylindrical surface 16b of the gasket 16, communicates through bores 16d and 16e with two annuli 22, 22' formed between the end faces 16c of the gasket 16 and the bottom 2b of the annular grooves 2, 2'.

Figure 4:
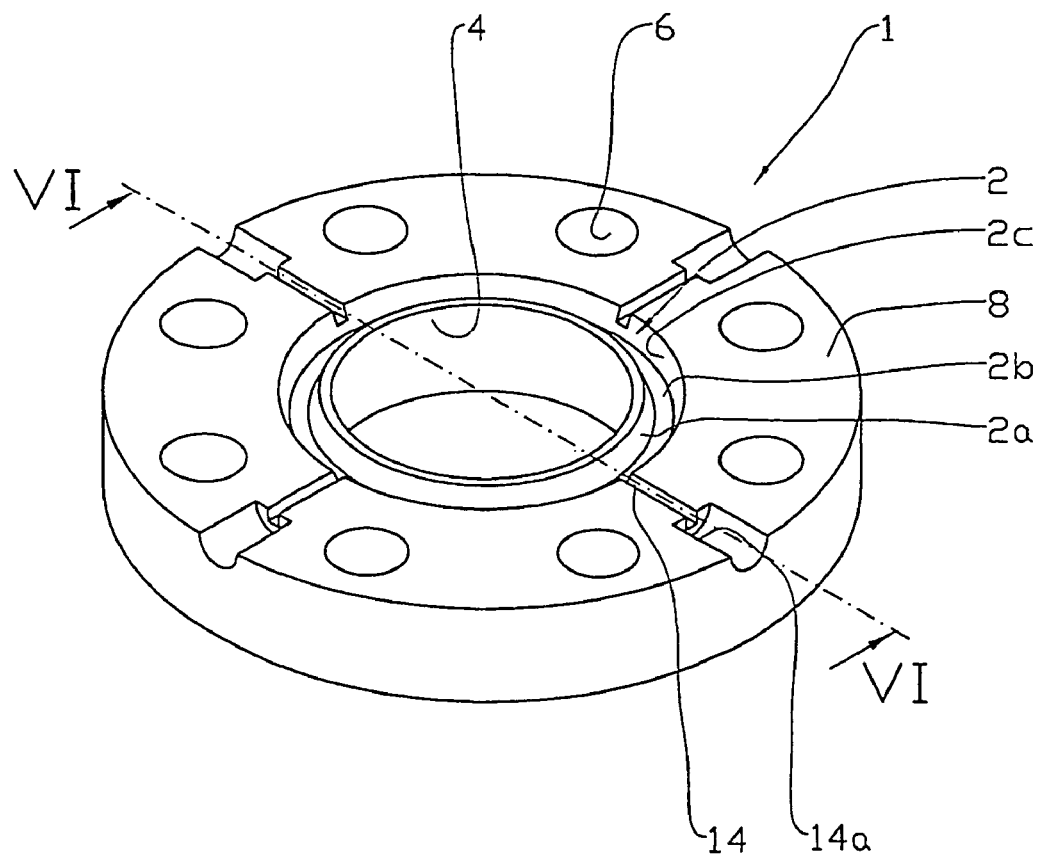
FIG. 4 is a perspective view of a pipe flange half in which is provided four grooves running outwards from the annular groove of the flange in the radial direction, to the outer portion of the flange, and where the cross section of the radial grooves is increased near the outside of the flange.
Figure 5:
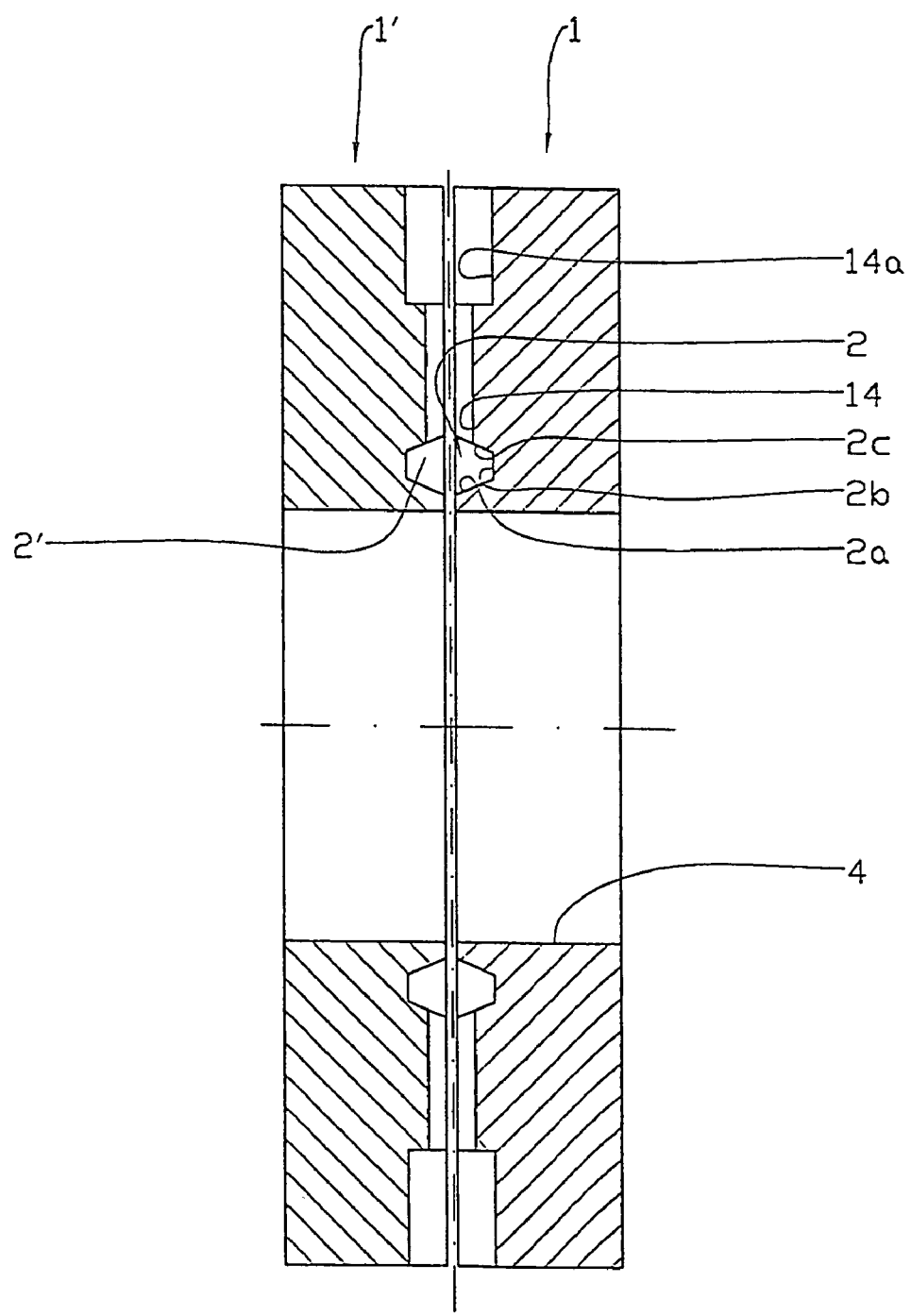
FIG. 5 shows a section IV—IV of the flange in FIG. 4, but with two flange halves put together.
Figure 6:
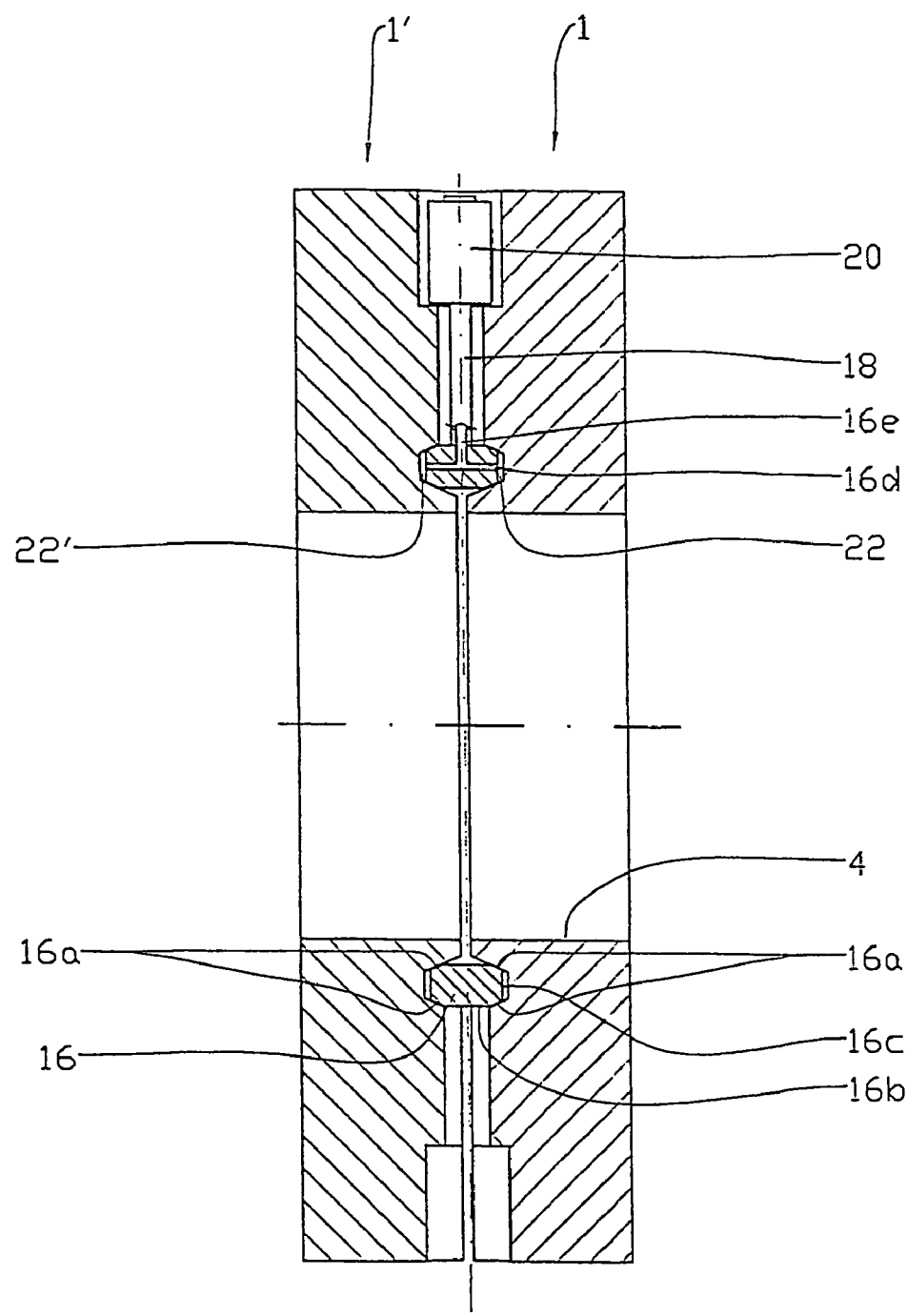
FIG. 6 shows the same section as FIG. 5, but here a gasket is positioned in the annular grooves of the flanges, where the gasket communicates with a connected-up pressure indicator via a connecting pipe.

In another embodiment, see FIG. 4, the entire end face of the flange 1 is in the same plane. The groove 14 joins a larger groove 14a located most proximate to the outer portion or the flange and designed to hold e.g. a pressure switch 20.

If a leak occurs from the central opening 4 of the flange halves 1, 1, fluid will flow in a gap formed between the inside seating surface 2a of the annular groove 2, 2' and the corresponding gasket surface 16a, and into one of the annuli 22, 22'. The annuli 22, 22' are thereby subjected to a pressure increase that will propagate to the pressure switch 20 through the bores 16d, 16e and the pipe 18, whereby the pressure switch 20 may deliver a signal indicating the occurrence of a leak in the flange connection.

The geometry of the grooves 2, 2' and the grooves 14 including pipe 18 are also well suited for use with gaskets having an oval cross section.

The application of grooves according to the invention allows pressure testing and leakage monitoring of flange connections by means of proven techniques, also when using flanges without an intermediate external opening.

What is claimed is:

1. An arrangement for detecting leakage from a flange connection, the arrangement comprising:
   opposing flange halves, each having an opposing end face;
   an annular groove formed in each end face, the annular groove having at least one seating surface;
   a gasket disposed between the flange halves and in the respective annular grooves such that a seal is formed between the gasket and the respective seating surfaces, wherein a sealed annular gap is formed between the gasket and each groove;
   a radial groove formed in each end face and extending from the annular groove essentially in a radial, outward direction;
   a leakage indicator at least partially disposed between the end faces and in the respective radial grooves, the leakage indicator arranged to detect leakage from the respective annular gaps.

2. The arrangement of claim 1, wherein the radial grooves have a cross-section that varies.

3. The arrangement of claim 1, wherein the radial grooves have a combined depth that is essentially equal to half the length of an external surface of the gasket.

4. The arrangement of claim 3, wherein the external surface of the gasket is cylindrical.

5. The arrangement of claim 1, wherein each end face comprises an inner end face and an outer end face, the outer end face being depressed relative to the inner end face.

6. The arrangement of claim 5, further comprising a shoulder connecting the inner and outer end faces and wherein the respective radial groove extends through the shoulder.

7. The arrangement of claim 1, wherein the radial grooves are formed in the respective end faces and the respective end faces are substantially planar.

8. The arrangement of claim 1, wherein the gasket comprises a through-bore that connects at least one of the annular gaps with the radial grooves.

9. The arrangement of claim 1, wherein the leakage indicator comprises a pressure switch arranged to transmit a signal upon a pressure change in the annular gaps.

10. The arrangement of claim 1, wherein the leakage indicator comprises a connector pipe.

11. The arrangement of claim 1, wherein each annular groove has a cross-section that is trapezoidal.

12. The arrangement of claim 1, wherein each annular groove comprises inner and outer seating surfaces and the gasket forms a seal against the inner and outer seating surfaces along the inner and outer periphery of the annual grooves.

13. The arrangement of claim 12, wherein each annular groove further comprises an end face extending between the inner and outer seating surfaces, the end face defining part of the annular gaps.

14. The arrangement of claim 1, comprising a plurality of radial grooves formed in each end face and extending from the respective annular groove essentially in a radial, outward direction.

15. An arrangement for detecting leakage from a flange connection, the arrangement comprising:
   opposing flange halves, each comprising an opposing end face;
   an annular groove formed in each end face, the annular groove having at least one seating surface;
   a gasket disposed between the flange halves and in the respective annular grooves such that a seal is formed between the gasket and the respective seating surfaces, wherein a sealed annular gap is formed between the gasket and each groove;
   a radial groove formed in each end face and extending from the annular groove in a radial, outward direction;

wherein each end face comprises an inner end face and an outer end face, the outer end face being depressed relative to the inner end face;

a shoulder connecting the inner and outer end faces and wherein the respective radial groove extends through the respective shoulder.

16. The arrangement of claim 15, comprising a plurality of radial grooves formed in each end face and extending from the respective annular groove essentially in a radial, outward direction.

17. The arrangement of claim 15, wherein the radial grooves have a cross-section that varies.

18. The arrangement of claim 15, wherein the radial grooves have a depth that is essentially equal to half the length of an external surface of the gasket.

19. The arrangement of claim 18, wherein the external surface is cylindrical.

* * * * *